United States Patent Office 3,418,249
Patented Dec. 24, 1968

3,418,249
STABLE ASPHALTENE DISPERSION-ASPHALT EMULSIONS AND THEIR PREPARATION
Armin C. Pitchford, Bartlesville, Okla., assignor to Phillips Petroleum Company, a corporation of Delaware
No Drawing. Filed Nov. 6, 1964, Ser. No. 409,579
7 Claims. (Cl. 252—311.5)

ABSTRACT OF THE DISCLOSURE

A stable emulsion which sets down on a working surface a low-penetration, high softening point asphalt is prepared by mixing a colloidal dispersion of asphaltenes containing from about 25 to about 80 weight percent asphaltenes, the remainder being substantially water and emulsifying agent, and an asphalt emulsion containing from about 50 to about 75 weight percent asphalt, the remainder being substantially water and emulsifying agent.

---

This invention relates to asphalt emulsions and a method of making same.

Heretofore it has been extremely difficult and in many cases impossible to prepare a stable emulsion, i.e. one which can be stirred with aggregate for more than 100 seconds before the emulsion breaks, from low-penetration, from 0 to about 70 (ASTM D5-61), high softening point, greater than 150 (ASTM D36-26), asphalts. The above difficulty is due in part to the fact that the viscosity of the asphalt exceeds 300 centistokes if the penetration value of the asphalt is less than about 70 (it being known in the art that to obtain a stable emulsion the viscosity of the asphalt cannot exceed about 300 centistokes when it first contacts the water). This difficulty is compounded by the fact that the low-penetration asphalts cannot be heated to a degree sufficient to obtain the necessary low viscosity of the asphalt because the temperature necessary to reduce the viscosity also causes the water to boil during milling and the boiling of the water prevents the formation of the emulsion. Thus, it has also been extremely difficult and in many cases impossible to apply low-penetration, high softening point asphalts to a working surface by setting down the asphalt from the desirable emulsion state.

Quite unexpectedly, it has been found that a stable, i.e. mixing time of greater than 100 seconds, emulsion can be prepared which sets down on a working surface a low-penetration, from about 30 to about 100 (ASTM D5-61), high softening point, from about 120 to about 150 (ASTM D36-26), asphalt. The emulsion is prepared by mixing a colloidal dispersion of asphaltenes containing from about 25 to about 80 weight percent asphaltenes, the remainder being substantially water and emulsifying agent, and an asphalt emulsion containing from about 50 to about 75 weight percent asphalt, the remainder being substantially water and emulsifying agent. The asphalt in the emulsion has a penetration of greater than 50 and a softening point of from about 30 to about 150, all penetration and softening point values being based upon the ASTM standards above set forth unless otherwise specified. The mixture of dispersion and emulsion is composed of from about 5 to about 50 weight percent of dispersion, the remainder being substantially emulsion.

Accordingly, it is an object of this invention to provide a new and improved method of preparing an asphalt emulsion from which a stable, low-penetration, high softening point asphalt product can be obtained. It is another object of this invention to provide a stable, low-penetration, high softening point asphalt product which can be employed in the emulsion form.

Other aspects, objects and the several advantages of the invention will be apparent to those skilled in the art from the description and the appended claims.

According to this invention asphaltenes from any source of asphalt such as crude oil, topped crude oil, or residue, i.e. crude oil which has been atmospherically distilled and vacuum distilled, are formed into an aqueous colloidal dispersion by known methods which dispersion will contain from about 25 to about 80 weight percent, preferably from about 30 to about 70 weight percent, asphaltenes; from about 20 to about 75 weight percent, preferably from about 25 to about 60 weight percent, water; and from about 0.01 to about 7.5 weight percent, preferably from about 0.05 to about 5 weight percent, of an emulsifying agent hereinafter described. An asphalt having a penetration of greater than 50 and a softening point of from about 30 to about 150 is emulsified by known methods to produce an asphalt emulsion containing from about 50 to about 75 weight percent, preferably from about 60 to about 68 weight percent, asphalt; from about 25 to about 50 weight percent, preferably from about 31 to about 39 weight percent, water; and from about 0.005 to about 3.5 weight percent, preferably from about 0.01 to about 2.5 weight percent, of an emulsifying agent hereinafter described. The colloidal asphaltene dispersion and the asphalt emulsion are then mixed with one another so that there is present in the composite mixture from about 5 to about 50 weight percent, preferably from about 10 to about 45 weight percent, of colloidal asphaltene dispersion with the remainder being substantially the asphalt emulsion. This mixture will upon breaking of the emulsion yield a low-penetration, high softening point asphalt product suitable for application to such working surfaces as roofs, felt, roads and the like, and for the preparation of paper laminates and the like.

The asphaltenes product of this invention is a hard particulate material insoluble in paraffin naphtha and having a molecular weight of from 100 to at least 2500. The asphaltenes of this invention are that portion of the asphalt which is insoluble in normal pentane at room temperature at an n-pentane/asphalt dilution ratio of 5/1 to 100/1, preferably 20/1. The asphaltenes can be prepared by extracting a petroleum source such as a crude oil and the like with a solvent capable of separating asphaltenes from said petroleum source. An example of a suitable feedstock is a topped crude oil having a boiling point of at least 650° F. and a viscosity greater than 155 Saybolt Furol seconds at 122° F. and a gravity, ° A.P.I., of at least 7. Solvents which can be employed to produce asphaltenes include normal paraffins and iso-paraffins having from 5 to 7 carbon atoms and include normal pentane and isopentane, normal hexane and iso-hexane, and the like. The colloidal dispersion of the asphaltenes can be made in any known manner such as by passing the mixture of asphaltenes, water, emulsifying agent and other additives through a colloid mill.

Asphalts that can be employed in preparing the emulsion of this invention include any of those bituminous materials used before and known in the art, such as natural asphalts or those derived from petroleum refining, for example by steam refining and/or air blowing, and the like. It is only necessary that the asphalt have a high penetration, i.e. greater than about 50, and a low softening point, i.e. from about 30 to about 150. The asphalt can be prepared from any petroleum source such as crude oil or the like. Suitable feedstocks include a topped crude oil having a boiling point of at least 650° F. and a viscosity greater than 150 Saybolt Furol seconds at 122° F. and a gravity, ° A.P.I., of at least 7. The asphalts are separated from the feedstock by extraction with a solvent capable of separating asphalt from said feedstock. Suitable solvents include normal paraffins and isoparaffins having 3 or 4 carbon atoms and include propane, isobutane and mixtures of these solvents. The emulsions can be prepared by passing a mixture of asphalt, water, emulsifying agents and other additives through a colloid mill or other known mixing apparatus.

The emulsifying agents employed in the apparatus of either the dispersion or the emulsion can be at least one material selected from the group consisting of anionic, cationic, nonionic and amphoteric emulsifying agents known in the art. Representative cationic emulsifying agents include a mixture of 1-(2-aminoethyl)-2-n-aliphatic-2-imidazolines where the aliphatic groups are heptadecenyl and heptadecadienyl, octylphenoxyethoxyethyldimethylbenzylammonium chloride, cetyltrimethylammonium bromide, and the like. Representative anionic emulsifying agents include alkaryl sulfonates such as methylnaphthalene sodium sulfonate, p-dodecylbenzene sodium sulfonate and the like, sulfates such as n-hexadecyl sodium sulfate and the like, and esters such as sodium diamyl sulfosuccinate and the like. Representative nonionic emulsifying agents include mixtures of octylphenoxypoly(ethyleneoxy)ethanols with 20, 30 and 40 ethyleneoxy groups in the poly(ethyleneoxy) chain, respectively, phenoxynonadeca(ethyleneoxy)ethanol and the like. Representative amphoteric emulsifying agents include N-lauryl-beta-aminopropionic acid, sodium N-coco-beta-aminopropionate, N-lauryl-N,N-dimethylglycine, N-cetyl-N,N-dimethylglycine, and the like. Other emulsifying agents are well known and therefore further elucidation is not necessary.

Although not essential, other materials or modifiers or additives used in preparing dispersions and emulsions can be incorporated in the dispersions and emulsions of this invention, which additives include stabilizing agents such as hydroxyethylcellulose, soya flour, aluminum chloride, calcium chloride and the like, viscosifiers such as carboxy vinyl polymers, preservatives such as sodium pentachlorophenoxide, and the like. Generally, when used, such additives will vary from a trace to about 0.5 weight percent of the dispersion or emulsion.

The dispersion-emulsion mixtures of this invention can be applied in paving, resurfacing, coating, etc. and will produce good uniform and smooth coatings. The mixture can be mixed with aggregate, for example in the ratio of 0.5 to 5 parts mixture to 4 to 10 parts aggregate, and the resulting slurry applied to the surface desired to be treated. After such application, the slurry sets up in the usual manner to provide an adhering coating. The aggregate to be used preferably has a moisture content in the range of 5 to 20 weight percent, and dry aggregate can be prewet to provide this moisture content. The electronegative aggregates, such as gravel, sand, and other siliceous materials, are preferred in preparing slurries of the same with the cationic asphalt emulsions and the electropositive aggregates such as limestone, etc. are preferred in preparing slurries of the same with the anionic asphalt emulsions. Both types of aggregate can be used in preparing slurries of the same with the nonionic or amphoteric asphalt emulsions.

In the "slurry seal" technique, moist sand can be mixed with the dispersion-emulsion mixtures to form a slurry of a consistency similar to that of a portland cement mix. This slurry can be continuously dumped from a revolving drum mixer or other suitable mixing device onto a road surface, and as the paving vehicle proceeds along the road a rubber drag apron can be used to smooth the slurry to a uniform thickness. For this purpose, a graded sand aggregate containing more than 10 percent fines passing a 200 mesh sieve is preferred. For slow-setting dispersion-emulsion mixtures at least 1½ to 2 minutes will usually be required to mix same with the aggregate and spread the resulting slurry on the road surface before the emulsion in the mixture breaks. In another application, the mixture, sand and portland cement or diatomaceous earth can be applied to surfaces by the "gunnite" method, which is especially suited for coating canals, reservoirs, water ponds, dam facings, etc. Such application can be made with pneumatic type spray equipment, such as a Refract-All gun. Glass wool, rock wool, hemp, cotton and other fibers can be added to the slurry or mixture to provide coatings having higher tensile strength and which will not crack with shifting of the base or surface to which the coating is applied.

EXAMPLE

Asphaltenes were prepared by normal pentane extraction of the 1025° F. bottoms of an intermediate aromatic crude. The bottoms represented a third of the crude and yielded about 15 weight percent asphaltenes. The asphaltenes dispersion was prepared by adding a water solution of the emulsifying agent to the charged tank of a Manton-Gaullin colloid mill. The asphaltenes, in finely divided form, were added slowly while recirculating the aqueous phase through the mill. After asphaltene addition was complete the stator-rotor spacing was adjusted to about 0.002 inch and milling was continued at room temperature for from 3 to 4 minutes.

The asphalt used in preparing the emulsion had a softening point of 102 and a penetration (100/5/77F) of 200. The emulsion was prepared by adding the water solution of an emulsifying agent to the charged tank of a Manton-Gaulin colloid mill. The asphalt was heated to about 250° F. and added slowly while recirculating the aqueous phase through the mill. After asphalt addition was completed the stator-rotor spacing was adjusted to about 0.005 inch and milling was continued at about 190° F. for 3 to 4 minutes.

The dispersion and emulsion were both stored in capped containers at room temperature for a minimum of 24 hours prior to aggregate mixing. The mixtures were prepared by circulating the desired proportions of dispersion and emulsion through the Manton-Gaulin colloid mill for 2 to 3 minutes.

Recipes for the dispersion and emulsion are:

| Test No | Dispersion 1 | Emulsion 2 |
| --- | --- | --- |
| Asphaltenes, wt. percent | 37.8 | |
| Asphalt, wt. percent | | 65.3 |
| Octylphenoxypoly(ethyleneoxy)ethanols with 30 ethyleneoxy groups in the poly(ethyleneoxy) chain | 3.5 | 2.1 |
| Water, wt. percent | 58.7 | 32.6 |

Recipes for the dispersion-emulsion blends, calculated compositions, and estimated penetrations and softening points for the blends are:

| Test No | 3 | 4 | 5 |
| --- | --- | --- | --- |
| Dispersion, wt. percent | 13.0 | | 40.0 |
| Emulsion, wt. percent | 87.0 | 33.3 | 60.0 |
| Blend from Test No. 5 | | 66.7 | |
| Calculated composition, wt. percent: | | | |
| Asphaltenes | 5.0 | 10.0 | 15.0 |
| Asphalt | 56.8 | 48.0 | 39.3 |
| Octylphenoxypoly(ethyleneoxy)ethanols with 30 ethyleneoxy groups in the poly(ethyleneoxy) chain | 2.3 | 2.5 | 2.5 |
| Water | 35.9 | 39.5 | 43.2 |
| Estimated penetration, 100 g./5 sec./77 F.[1] | 100 | 50 | 30 |
| Softening point, ring and ball, F.[1] | 122 | 137 | 149 |

[1] These values could not be determined conveniently because in order to make the penetration and softening point tests, the sample would have to be evaporated from the emulsion. Since the emulsion was to be used for additional mixing tests, the values were estimated from a graph of the penetration and softening point values for the asphalt and for blends of the asphalt with 0, 10 and 20 weight percent asphaltenes:

| | Penetration | Softening point |
| --- | --- | --- |
| Asphalt | 200 | 102 |
| Asphalt +10 wt. percent asphaltenes | 50 | 137 |
| Asphalt +20 wt. percent asphaltenes | 21 | 160 |

The penetration and softening point values of the dispersion-emulsion blends will be substantially the same as those values of the product after the emulsion-dispersion is broken, applied to the working surface and left as is done in actual practice.

The dispersion-emulsion blends were evaluated according to the aggregate mixing test which test was designed to simulate mixing in a slurry seal unit. The apparatus in which the tests were made comprised a heavy 4-inch diameter, 6-inch deep container equipped with a 3-blade paddle stirrer powered by a variable speed motor. A 100-gram portion of the aggregate was placed in the container and wetted with about 20 milliliters of water while being stirred at low speed, after which stirring speed was increased to about 100 rpm. From 18 to 20 grams of the dispersion-emulsion blend was added rapidly to the wet aggregate, and a timer was started the instant the blend contacted the aggregate. Mixing time was recorded as the time mix could be stirred before the emulsion broke, as evidenced by solidification of the mix. The mixing time should be at least 100 seconds in order to permit adequate time for mixing and applying the mix to the working, e.g. road, surface.

Specifications for the aggregate used in evaluating the dispersion-emulsion blend according to the mixing test are as follows:

Source: Baxter Springs, Kans. (Kenoyer sand).

Sieve analysis, mesh: Wt. percent
10+ _____ 2.2
20+ _____ 7.3
40+ _____ 33.3
60+ _____ 18.8
100+ _____ 15.3
200+ _____ 6.1
200− _____ 7.3

Surface area, 100− fines, m.²/g. _____ <5
Composition (X-ray diffraction, 100− fines):
  Alpha quartz, $SiO_2$ _____ +++
  Dolomite, $CaMg(CO_3)_2$ _____ +
  Calcite, $CaCO_3$ _____ +
  Calcium in total aggregate as percent $CaCO_3$ _____ 3.6

The results of aggregate mixing tests are as follows:

|  | 3 | 4 | 5 |
| --- | --- | --- | --- |
| Mixing time, seconds | 180+ | 180+ | 180+ |
| Slurry appearance | Excellent | Excellent | Excellent |

The dispersion-emulsion blends were also evaluated by the cement mixing test (ASTM D244-60). The cement mixing tests indicate the stability of the emulsion in the presence of portland cement, and the lower its value the greater such stability. The results of these tests are as follows:

Cement mixing tests                  Weight percent
3 _____ —
4 _____ <0.1
5 _____ <0.1

Reasonable variations and modifications of this invention can be made or followed, in view of the foregoing, without departing from the spirit or scope thereof.

I claim:

1. A method of preparing a stable asphaltene dispersion-asphalt emulsion mixture from which a low-penetration, 30 to 100, high softening point, 120 to 150, asphalt product is obtained upon removal of the water from the dispersion-emulsion, said dispersion-emulsion having a mixing time with aggregate of more than 100 seconds without breaking down, comprising forming a colloidal dispersion of asphaltenes containing from about 25 to about 80 weight percent asphaltenes with the remainder being substantially water and an effective emulsifying amount of an emulsifying agent, forming an asphalt emussion containing from about 50 to about 75 weight percent asphalt with the remainder substantially water and an effective emulsifying amount of an emulsifying agent, said asphalt having a penetration of greater than 50 and a softening point of from about 30 to about 150, and mixing said dispersion and said emulsion in relative amounts so that said dispersion is present in the mixture in the amount of from about 5 to about 50 weight percent, the remainder being substantially said emulsion.

2. The method of claim 1 wherein said colloidal dispersion contains from about 30 to about 70 weight percent asphaltenes, said asphalt emulsion contains from about 60 to about 68 weight percent asphalt, and said dispersion is present in the mixture in the amount of from about 10 to about 45 weight percent, the remainder being substantially said emulsion.

3. The method according to claim 1 wherein said mixture is contacted with a working surface to lay down on that surface said low penetration, high softening point asphalt product.

4. A method of preparing an asphaltene dispersion-asphalt emulsion blend capable of being mixed with aggregate for more than 100 seconds without breaking down from which an asphalt product having a penetration of from about 30 to about 100 and a softening point of from about 120 to about 150 is obtained upon removing the water from the dispersion-emulsion comprising, forming an aqueous colloidal dispersion of asphaltenes containing from about 25 to about 80 weight percent asphaltenes, from about 20 to about 75 weight percent water and from about 0.1 to about 7.5 weight percent of an emusifying agent consisting essentially of octylphenoxypoly(ethyleneoxy)ethanol with 30 ethyleneoxy groups in the poly(ethyleneoxy) chain, forming an asphalt emulsion containing from about 50 to about 75 weight percent asphalt which has a penetration of greater than 50 and a softening point of from about 30 to about 150, from about 25 to about 50 weight percent water and from about 0.005 to about 3.5 weight percent of an emulsifying agent consisting essentially of octylphenoxypoly(ethyleneoxy)ethanol with 30 ethyleneoxy groups in the poly(ethyleneoxy) chain, and mixing said dispersion and emulsion in relative amounts so that said dispersion is present in the mixture in the amount of from about 5 to about 50 weight percent, the remainder being substantially said emulsion.

5. A stable asphaltene dispersion-asphalt emulsion comprising a mixture of a colloidal dispersion of asphaltenes containing from about 25 to about 50 weight percent asphaltenes, the remainder being substantially water and an effective emulsifying amount of an emulsifying agent and an asphalt emulsion containing from about 50 to about 75 weight percent asphalt, the remainder being substantially water and an effective emulsifying amount of an emulsifying agent, said asphalt having a penetration greater than 50 and a softening point of from about 30 to about 150, and said dispersion is present in the mixture in the amount of from about 5 to about 50 weight percent, the remainder being substantially said emulsion.

6. The dispersion-emulsion of claim 5 wherein the colloidal dispersion contains from about 30 to about 70 weight percent asphaltenes, the emulsion contains from about 60 to about 68 weight percent asphalt and the dispersion is present in the mixture in the amount of from about 10 to about 45 weight percent, the remainder being substantially said emulsion.

7. An asphaltene dispersion-asphalt emulsion which can be mixed with aggregate for at least 100 seconds without breaking down and which after breaking down yields an asphalt product having a penetration of from about 30 to about 100 and a softening point of from about 120 to about 150 comprising a mixture of an aqueous colloidal dispersion of asphaltenes containing from about 25 to about 80 weight percent asphaltenes, from about 20 to about 75 weight percent water and from about 0.01 to about 7.5 weight percent of an emulsifying agent consisting essentially of octylphenoxypoly(ethyleneoxy)ethanol with 30 ethyleneoxy groups in the poly(ethyleneoxy)

chain, and an asphalt emulsion containing from about 50 to about 75 weight percent asphalt having a penetration of greater than 50 and a softening point of from about 30 to about 150, from about 25 to about 50 weight percent water and from about 0.005 to about 3.5 weight percent of an emulsifying agent consisting essentially of octylphenoxypoly(ethyleneoxy)ethanol with 30 ethyleneoxy groups in the poly(ethyleneoxy) chain, and said dispersion is present in the mixture in the amount of from about 5 to about 50 weight percent, the remainder being substantially said emulsion.

References Cited

UNITED STATES PATENTS

| | | | |
|---|---|---|---|
| 2,073,088 | 3/1937 | Anderson et al. | 208—23 X |
| 2,993,003 | 7/1961 | Mertens et al. | 252—311.5 |

LEON D. ROSDOL, *Primary Examiner.*

R. D. LOVERING, *Assistant Examiner.*

U.S. Cl. X.R.

106—277; 208—23